United States Patent [19]

Huignard et al.

[11] 4,304,458

[45] Dec. 8, 1981

[54] ARRANGEMENT FOR DISPLAYING DEFORMATIONS OF DEFORMABLE STRUCTURES BY HOLOGRAPHIC INTERFEROMETRY

[75] Inventors: Jean-Pierre Huignard; Jean-Pierre Herriau; Jean-Louis Bruneel, all of Paris, France

[73] Assignee: Thomson-CSF, Paris, France

[21] Appl. No.: 887,341

[22] Filed: Mar. 16, 1978

[30] Foreign Application Priority Data

Mar. 23, 1977 [FR] France ................ 77 08627

[51] Int. Cl.³ ................................ G01B 9/021
[52] U.S. Cl. ................... 350/3.63; 356/347; 365/125; 430/1
[58] Field of Search ............... 350/3.61, 3.62, 3.63, 350/3.64, 356; 356/347, 348; 365/110, 112, 117, 125, 216; 96/27 H; 430/1, 2

[56] References Cited

U.S. PATENT DOCUMENTS

| 3,652,145 | 3/1972 | Thaxter | 350/3.64 |
|---|---|---|---|
| 3,717,415 | 2/1973 | Woerdman | 356/394 |
| 3,762,215 | 10/1973 | Aleksoff | 73/656 |
| 3,831,153 | 8/1974 | Oliver et al. | 365/110 |
| 3,847,465 | 11/1974 | Micheron et al. | 350/3.64 |
| 3,856,986 | 12/1974 | Macovski | 356/347 X |
| 3,897,995 | 8/1975 | Penn | 350/3.62 X |
| 3,899,921 | 8/1975 | Hockley | 356/347 X |
| 3,940,203 | 2/1976 | La Russa | 350/3.61 X |
| 4,124,268 | 11/1978 | Micheron et al. | 350/3.63 |
| 4,138,189 | 2/1979 | Huignard et al. | 350/3.64 |
| 4,205,917 | 6/1980 | Abramson | 356/347 |

FOREIGN PATENT DOCUMENTS 2174741 10/1973 France.

OTHER PUBLICATIONS

Tseng et al., "Electro-Optical Memory with Write, Read and Erase . . . ", IBM Tech. Discl. Bull., vol. 15, No. 4, Sep. 1972, pp. 1327-1328.
Iwasa et al., "Bi$_{12}$SiO$_{20}$ Block Data Composer . . . ", Digest of Tech. Papers of Top Mtg. on Optical Storage of Dig. Data, Mar. 1973, pp. TuB6-1-4.
Micheron et al., "High Photosensitivity Volume Hologram . . . ", Optics Communications, vol. 18, No. 2, Jul. 1976, pp. 216-217.

Primary Examiner—John D. Lee
Attorney, Agent, or Firm—Cushman, Darby & Cushman

[57] ABSTRACT

The arrangement for displaying deformations of deformable structures by holographic interferometry, in which the interferogramme of the object is obtained by double exposure for an object subjected to periodic deformation or by prolonged exposure by comparison with the period of vibration for a vibrating object, comprises a recording electro-optical, photoconductive crystal to which is applied an electrical field substantially orthogonal to the mean direction of the fringes. The interferogramme is viewed in an image plane or recorded in a memory tube where it is desired to memorize the information because readout destroys the information. The arrangement can be made compact by integration of the displaying means in an enclosure. In that case, the source furnishes a reference beam and an object beam which are respectively directed towards the enclosure and the object by optic cables.

19 Claims, 7 Drawing Figures

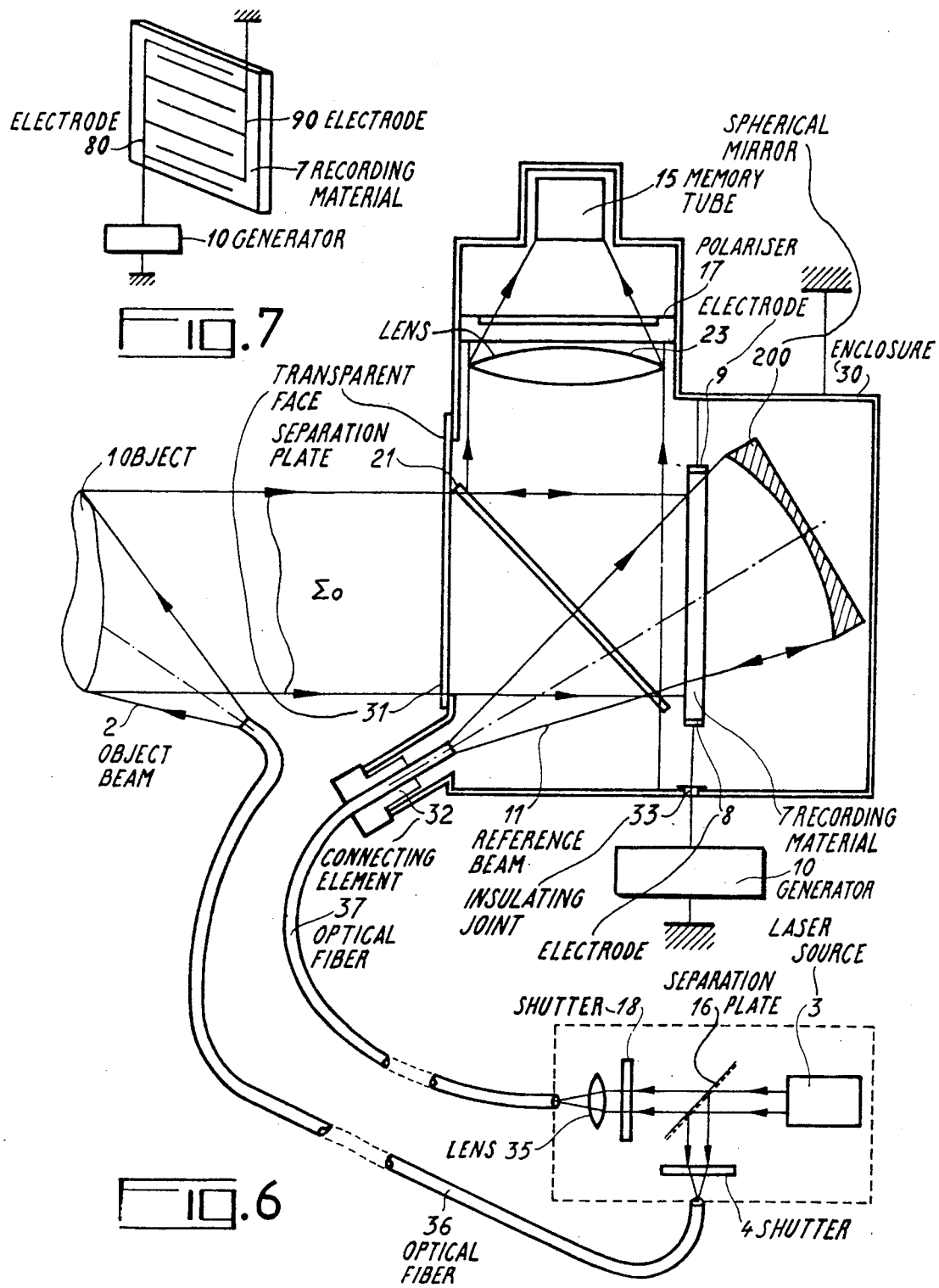

ARRANGEMENT FOR DISPLAYING DEFORMATIONS OF DEFORMABLE STRUCTURES BY HOLOGRAPHIC INTERFEROMETRY

This invention relates to arrangements for displaying deformations of deformable structures by holographic interferometry.

Holographic systems can be used for the non-destructive testing of mechanical components placed under stress, observation of the deformations being rendered possible by the memory effect in holographic media. The recording of two successive wave fronts with the same reference beam and the restoration by that reference beam of the recorded fringes enables an interference pattern corresponding to the deformations to be created. The location of the fringes is directly associated with the deformations which have taken place between the two recorded states. Conventional display systems based on holographic interferometry use as their recording medium high-resolution photographic supports which necessitate chemical development and extremely accurate repositioning after the first recording. It is not possible with arrangements using recording materials such as these to follow the deformations of the structures, particularly when the structures in question are vibrating structures.

According to the invention, there is provided an arrangement for displaying deformations of deformable structures by holographic interferometry comprising an electro-optical and photoconductive recording material in which an interferometric hologramme corresponding to the deformations is recorded, polarising means for applying to said material an electrical field orthogonal to the mean direction of the interference fringes to be recorded, and displaying means for forming images of said deformations from said holographic interferogramme.

For a better understanding of the present invention and to show how the same may be carried into effect, reference will be made to the following description and the attached drawings, among which:

FIG. 6 shows a compact embodiment of the display arrangement.

FIG. 7 shows another embodiment of the polarising means on the recording crystal.

Figure 1:
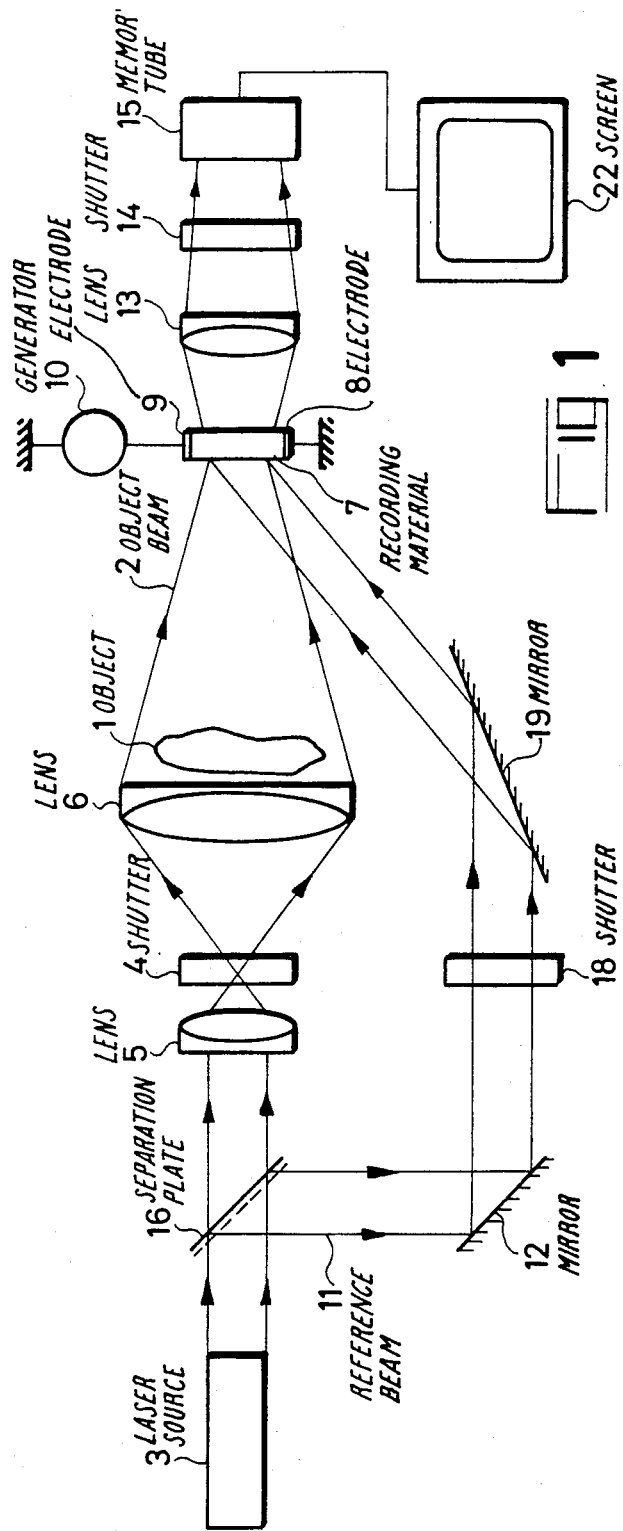
FIG. 1 shows a first embodiment of the display arrangement for an object which transmits light, interferometry being obtained by double exposure.

FIG. 1 shows the layout of the arrangement for displaying a deformable object 1 by holographic interferometry. This object is illuminated in a first phase by an object beam 2 issuing from a laser type source 3. This object beam may be masked by means of a shutter 4 situated in its path between two lenses 5 and 6. The beam 2 diffracted by the transmissive object 1 is directed towards a thick, electro-optical and photoconductive recording material 7. This material may be for example a $Bi_{12}SiO_{20}$ crystal or a $Bi_{12}GeO_{20}$ crystal, because crystals such as these have good optical qualities, high sensitivity (equivalent to that a high-resolution photographic plates) and a relatively low recording energy of the order of one millijoule per square centimeter for a recording beam supplied by an argon laser source. In addition, the efficiency of diffraction under an applied field of 6 KV/cm may reach 10% and erasure only requires an exposure energy and time comparable with those required for recording. The number of recording-reading cycles in materials of this type is not limited. Finally, it is possible to obtain such crystals in sufficiently large dimensions for the applications envisaged.

Figure 2:
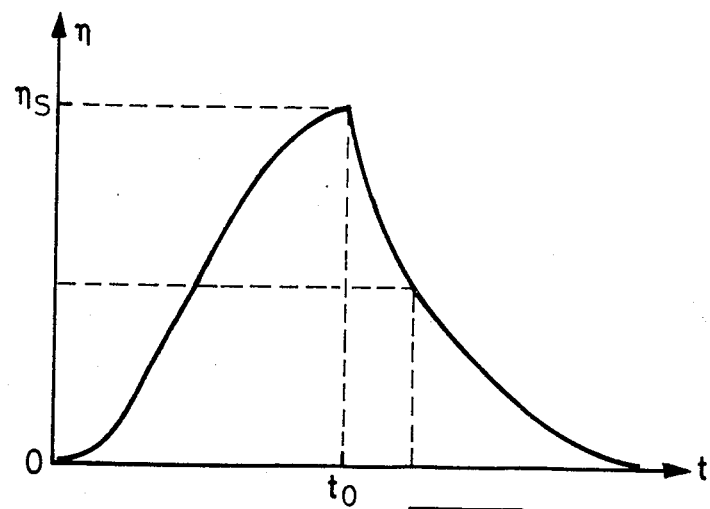
FIG. 2 is a curve representing the variations in the efficiency of diffraction as a function of the exposure time.

Accordingly, the crystal is subjected to an electrical field $\vec{E}$ of the order of 6 KV/cm. To this end, two electrodes 8 and 9 are placed on two parallel faces of the crystal connected to the two terminals of a voltage generator 10. A separation plate 16 situated in the path of the beam provides for the formation of a parallel reference beam 11 which is also directed towards the recording medium by means of two return mirrors 12 and 19. A shutter 18 placed in the path of the reference beam enables this beam to be masked. The plane containing the optical axes of the object and reference beams is parallel to the electrodes carried by the crystal so that the electrical field $\vec{E}$ is orthogonal to the interference fringes. The field $\vec{E}$ is preferably applied parallel to a preferential axis of the crystal along which the transfer of charges is readily accomplished. After the recording medium, a lens 13, a shutter 14 and a memory tube 15 capable of recording images are placed along the axis of the object beam. The images in question may then be shown on a screen 22. The arrangement operates as follows: in a first phase, the object 1 is exposed to the object beam 2 and the wave front diffracted by that object is received by the crystal at the same time as the reference wave. The exposure time $t_o$ is such that the corresponding figure is recorded to saturation, i.e. the maximum diffraction efficiency $\eta_s$ is reached. The curve of FIG. 2 shows this diffraction efficiency $\eta$ as a function of the exposure time. During this first phase, the shutter 14 is closed and the shutters 4 and 18 are open. In a second phase, the object 1 is re-exposed to the object beam, the radiation diffracted by the object and the reference beam interfere. The exposure time during this second phase is selected in such a way that the first interference figure recorded is only semi-erased so that, during the third phase which is the reading phase, the restored radiations corresponding to the two successive images of the object interfere and the contrast of the fringes is maximal. The second phase therefore has a duration around to/2.

Since reading is destructive, the reading phase must not exceed to/2, at the end of which time the crystal returns to its initial state. During this reading phase, the shutters 14 and 18 are open and the shutter 4 is closed. The corresponding pattern is recorded on the memory tube 15 and may then be projected onto the screen 22.

Figure 3:
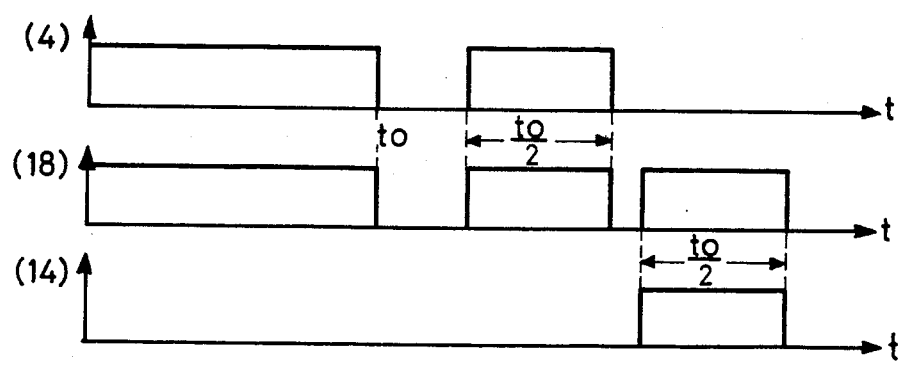
FIG. 3 shows the control signals applied to the shutters for the object beam, the reference beam and the transmitted beam of the arrangement shown in FIG. 2.

The blanking functions of the shutters 4, 14 and 18 for the object beam, the reference beam and the restored beam as shown in FIG. 3 may be performed by electrically controlled electro-optical devices using for example crystals of lithium niobate or KDP. Since the object is not permanently illuminated by the object beam in an arrangement such as this, it is possible, as shown in FIG. 1, to use the same reference beam for recording and reading, the restored interferometric image being in no way fogged by the direct object beam transmitted by the recording medium because this beam is masked during reading. An arrangement such as this enables the deformation of a moving object to be observed because, since the exposure time to is of the order of 40 ms, the appearance frequency of the interferogrammes when the shutting functions are automated is compatible with a television scan. Since the thick hologramme is illuminated during reading by the same reference beam as used for recording and since the hologramme is readable by transmission, the image formed is a virtual image and, if it has to be shown on a screen, a convergent lens 13 as described has to be used so as to form a real image.

Figure 4:
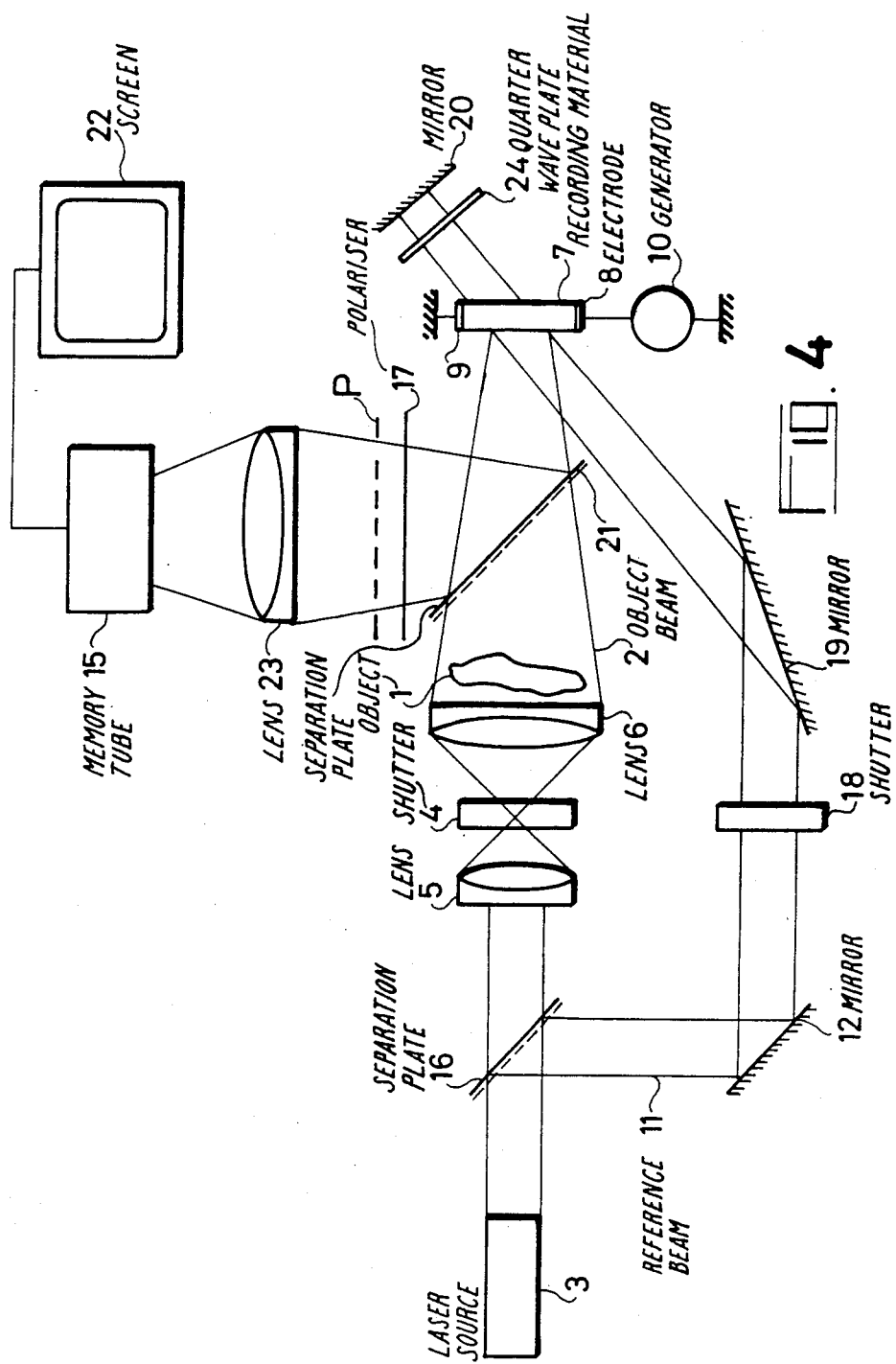
FIG. 4 shows a second embodiment of the display arrangement for a transmissive object, interferometry being obtained by double exposure.

The display arrangement based on double exposure holographic interferometry which is shown in FIG. 4 enables a real image to be formed during reading so that there is no need for a convergent system in the path of the restored beam. In this drawing, the same elements as in FIG. 1 have been denoted by the same reference numerals.

The recording part of the system is the same as described above: the transmissive object 1 is illuminated by the object beam 2 coming from the source 3 when the shutter 4 placed between the two lenses 5 and 6 is open. The beam diffracted by the object is received by the crystal 7 carrying the electrodes 8 and 9 connected to the terminals of the voltage generator 10. The crystal is also illuminated by the reference beam 11 issuing from the same source by means of a separation plate 16 and a system of return mirrors 12 and 19 when the shutter 18 is open.

The arrangement additionally comprises for restoration a return mirror 20 orthogonal to the reference beam transmitted by the recording crystal intended to return the light towards the crystal. The inverse return of the light thus obtained enables a beam forming a real image to be restored. This image is separated from the real object by means of a separation plate 21 and is formed in the conjugate plane P of the object relative to the plate 21. This image may be viewed directly in the plane P or may be recorded in the memory tube 15 by means of an optical system 23 to enable it to be subsequently projected onto a screen 22. A quarter wave plate 24 may be arranged in the path of the reference beam between the mirror 20 and the crystal 7 to reduce the optical noise introduced by reflection, and a polariser 17 may be placed in the path of the restored beam after the separation plate 21 in order to isolate the interferometric image formed from parasitic illumination because the polarisation state of the diffracted beam during reading is different from that of the recording beams due to the birefractive effect and the rotatory power of the crystal.

The arrangement shown in FIG. 4 forms an interferometric image of the deformations occurring between two exposures and functions in the same way as the arrangement described with reference to FIG. 1. A first exposure of duration to corresponds to the recording of a first interference figure and a second exposure with a duration of around to/2 corresponds to the recording of a second interference figure.

The resulting figure corresponding to the deformations occurring between the two exposures is restored in a third phase with a duration of around to/2.

The display arrangements operating by double exposure holographic interferometry shown in FIGS. 1 and 4 are intended for displaying the deformations of transmissive objects. It is possible to use similar systems for reflecting objects. In this case, the object beam is directed towards the object 1 so that the light diffracted by the object is received by the recording material.

These arrangements may be used for the non-destructive testing of objects submitted to an aperiodic movement or to a slow periodic movement.

Figure 5:
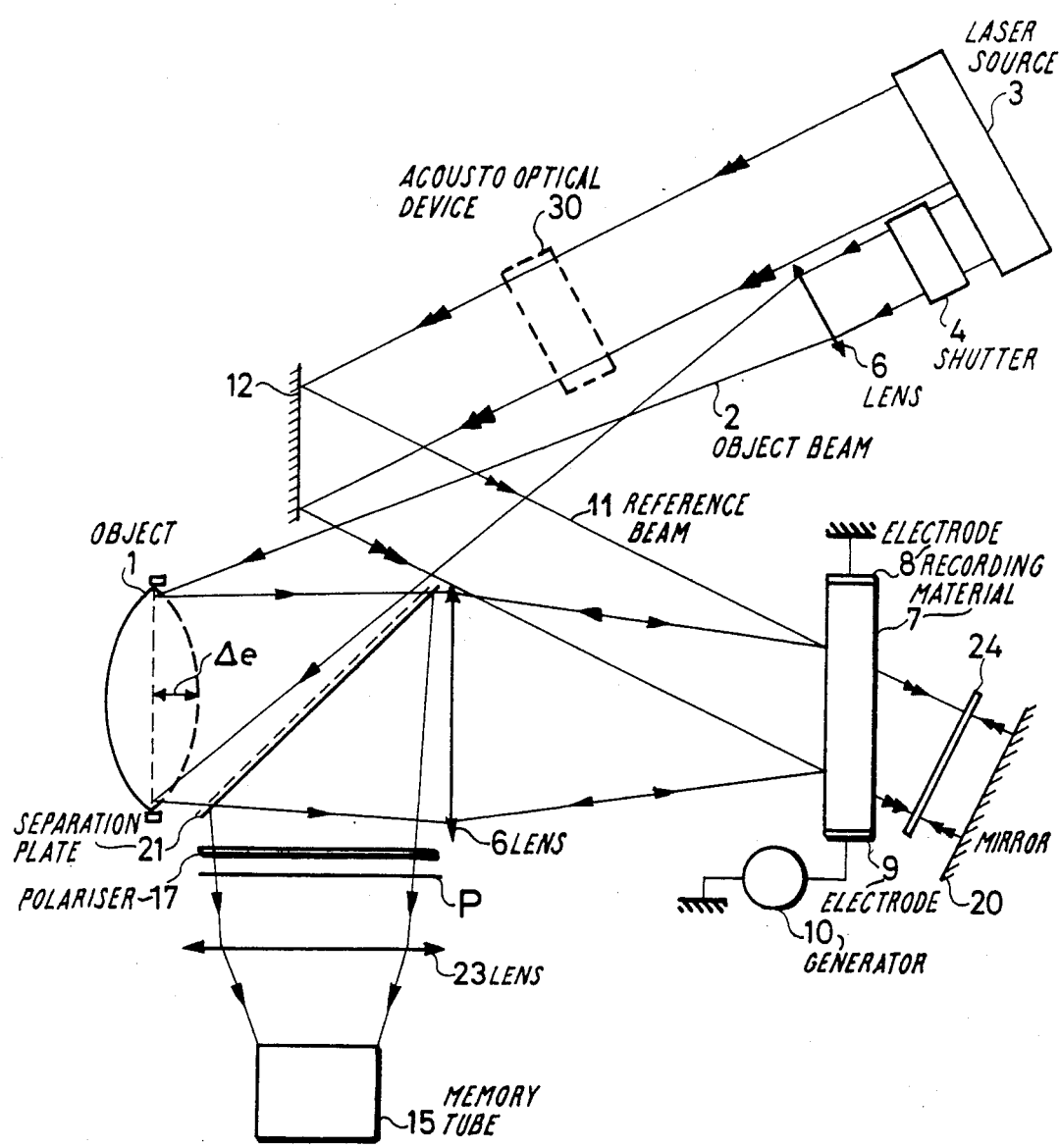
FIG. 5 shows a third embodiment of the display arrangement according to the invention for a vibrating reflective object, interferometry being obtained by prolonged exposure relative to the period of vibration.

Another display system based on holographic interferometry may be used for testing objects subjected to a rapid periodic movement. This arrangement is shown in FIG. 5 for an at least partly reflecting object. In this drawing, the same elements as in FIGS. 1 and 4 have been denoted by the same reference numerals. In FIG. 5, a source 3 emits a laser beam from which the object radiation beam 2 and the reference beam 11 are formed. The object radiation is diffracted by a vibrating reflective object 1 denoted by a solid line in one end position, the middle position and the other end position being denoted by dotted lines. The amplitude of the vibration is $\Delta e$. The optical wave diffracted by the vibrating object is received by the recording material 7 after having passed through the partially transparent plate 21 and a convergent lens 6. The reference beam is also received by the recording material.

Experience has shown that, if the exposure time of the recording material is long by comparison with the period of vibration and if the maximum amplitude $\Delta e$ of the deformation does not exceed a few tens of the wavelength of the radiation, a fixed system of interference fringes is recorded in the material. These interference fringes correspond to the first zeros of Bessel's function $$J_0\left(\frac{4\pi}{\lambda}\Delta e\right)$$

where $\lambda$ is the wavelength of the radiation. During the interference between the optical reference carrier of pulsation $\omega_o$ with the Bessel components of order higher than $(\omega_o + \omega_v)$ where $\omega_v$ is the pulsation of the vibration, a mobile system of interference fringes is also created, but this mobile system of fringes is not recorded in the thick electro-optical photoconductive material 7 on condition that the exposure time is long by comparison with the period of vibration of the object to be analysed, the exposure time being selected in such a way that the maximum diffraction efficiency at saturation $\eta_s$ is reached, as in the case of interferometry by double exposure. For example, for a laser source having a wavelength $\lambda$ of 514 nm and an output of 10 mW/cm² and for a recording material having a sensitivity of 1 mJ/cm², the exposure time required to obtain saturation efficiency is of the order of 40 to 50 ms. The image thus obtained during reading therefore corresponds to the image of the object to be analysed modulated by black fringes corresponding to the zeros of Bessel's function $$J_0\left(\frac{4\pi}{\lambda}\Delta e\right).$$

It is also possible to obtain by the restored beam the image of the object modulated by black fringes corresponding to the zeros of higher-order Bessel's functions, such as $$J_1\left(\frac{4\pi}{\lambda}\Delta e\right) \text{ or } J_2\left(\frac{4\pi}{\lambda}\Delta e\right).$$

To this end, an acousto-optical device 30 (shown in dotted lines in FIG. 5) is placed in the path of the reference beam. This device is intended to introduce into the reference beam of pulsation $\omega_o$ a frequency shift amounting to a multiple of the vibration frequency of the object to be analysed. If $\omega_v$ is the pulsation of the object to be analysed, the restored image will comprise black fringes corresponding to the zeros of the Bessel function $$J_1\left(\frac{4\pi}{\lambda}\Delta e\right)$$

for a reference beam of pulsation $(\omega_o+\omega_v)$ and black fringes corresponding to the zeros of the Bessel function $$J_2\left(\frac{4\pi}{\lambda}\Delta e\right)$$

for a reference beam of pulsation $(\omega_o+2\omega_v)$.

The arrangement intended for reading is similar to that described with reference to FIG. 4. A holographic observation arrangement such as this operating by time-average holographic interferometry enables the vibration amplitudes of vibrating reflective surfaces to be measured with the precision afforded by interferometry and avoids the use of sensitive elements placed in contact with the vibrating surface.

The use of a thick electro-optical and photoconductive material, such as a crystal of $Bi_{12}SiO_{20}$ or $Bi_{12}GeO_{20}$, in an arrangement of this type affords the same advantages as in the case of holography by double exposure, i.e. above all the possibility of viewing the interferometric images directly, i.e. without development. The invention is not limited to the embodiments of the display arrangements described and illustrated. In particular, it is possible, still using a thick, electro-optical and photoconductive material in the transverse electro-optical configuration (i.e. polarised in such a way that the electrical field is orthogonal to the mean direction of the fringes), to employ other methods of viewing deformable structures by holographic interferometry. In addition, the display systems shown in FIGS. 4 and 5 may comprise, for forming a reading beam directed oppositely to the reference beam, an auxiliary source having the same wavelength as the reference beam in place of the return mirror 20.

The display arrangement shown in FIG. 6 is a compact arrangement comprising on the one hand a holographic display head and on the other hand optical source means.

To this end, the propagation of the beam issuing from the source is guided in optical cables. Such an arrangement has numerous advantages in terms of industrial application. Firstly, the laser source may be situated remote from the object whose deformations it is desired to follow and even in another room. In addition, an arrangement of that type eliminates the need for the usual mechanical adjustments necessitated by the presence of lenses or mirrors and, more generally, of discrete elements in the path of the beam.

The elements similar to those described with reference to the preceding drawings have been denoted by the same reference numerals.

In particular, the object 1 to be analysed is illuminated by an object beam 2. The object diffracts the beam and an object wave $\Sigma O$ emerges from the object. This wave is received by an electro-optical, photoconductive recording material 7. This material may be for example a crystal of $Bi_{12}SiO_{20}$ or CdS. The recording material is also illuminated by a reference beam 11. In this system, the object beam and the reference beam are emitted by optical cables connected to the laser source 3, the reference beam having a spherical wave surface.

Accordingly, the mirror 200 which is intended to reflect the reference wave surface without deforming it to enable the diffracted image to be permanently viewed is a spherical mirror. To ensure that the direct reference wave used for recording and the reflected reference wave used for restoration are identical, the quasi-punctiform source formed by the emissive surface of the optical cable emitting the reference wave is placed at the centre of curvature of the spherical mirror 200. The electro-optical photoconductive crystal is provided with electrodes 7 and 8 connected to the two terminals of a voltage source 10 which enables an electrical field orthogonal to the mean direction of the interference fringes to be applied to the crystal, so that the crystal is in a transverse electro-optical configuration. For a crystal measuring 30×30 mm for example, the electrical field applied may be of the order of 3 to 6 KV/cm. Instead of flat electrodes deposited on two faces of the crystal, it is possible to apply the electrical field to the crystal by electrodes in the form of interdigital combs. One such mode of application of the electrical field is illustrated in FIG. 7, the electrodes 80 and 90 being in the form of interdigital combs. Since the image is diffuse, the interdigital combs do not affect the restored interferogramme.

It was mentioned above that the reference object beams are emitted by optical cables connected to the laser source, these cables ensuring the guided propagation of the beam from the source to the point of use. To this end, the optical head of the system comprises the laser source 3, a separating plate 16, a lens 35 and two beam shutters 4 and 18. The laser source may be of the argon laser or YAG laser type doubled in frequency. These two types of laser emit a visible beam in the sensitivity range of the recording crystal. The beam emitted by the laser is received by the separating plate 16 which reflects part of the beam and directs it towards the entry face of an optical cable 36 intended to transmit the object beam. That part of the beam which is transmitted by the separating plate 16 is received by the lens 35 after having passed through the shutter 18. This lens focusses the beam onto the entry face of a monomode optical fibre 37 intended to transmit the reference beam.

This optical reference fibre 37 is monomode so that the wave surface of the beam entering the fibre is not deformed and it is possible to obtain at the exit end of this fibre a point source forming a spherical wave surface. The diffracted object wave contains only part of the beam received by the object. Accordingly, to ensure that the contribution of the object and reference beams on the crystal is approximately the same, the separating plate 16 is such that the object beam has a greater intensity than the reference beam. The illumination of the object by the object beam is not critical insofar as, even if the optical object cable moves slightly and if the illumination is not uniform, an object wave will nevertheless be emitted towards the recording crystal. The same does not apply to the reference beam because the emissive face of the optical reference cable has to be positioned very precisely in relation to the spherical mirror. To obtain precise positioning of the various discrete elements which remain necessary in the vicinity of the crystal, the system comprises an enclosure 30 in which the various elements are arranged. This enclosure comprises a transparent face 31 through which the object wave enters the enclosure. In addition, the optical reference cable is rigidly fixed to the enclosure by a connecting element 32. The recording crystal is also fixed to the enclosure and the connection of the electrodes carried by the crystal to the voltage source 10 is established on the one hand by a direct connection to the enclosure, the enclosure being earthed, and on the other hand by a connection connected to the positive terminal of the voltage source, this connection passing through the enclosure in an insulating joint 33. To enable the image to be formed in a plane different from the object, the enclosure also comprises a separating plate 21 and, in the path of the restored beam, a lens 23, a polariser 17 and the image-storing tube 15. The lens enables the size of the restored image to be adapted to the diameter of the vidicon tube used for detection. The polariser 17 is oriented in such a way as to isolate the restored image from the optical noise, if any, introduced by the incident object and reference beams. The separating plate 21 is placed as close as possible to the recording crystal and may even be fixed to the crystal in such a way that the system is as compact at possible.

In addition to the precise positioning of the emissive face of the reference cable in relation to the spherical return mirror mentioned above, the reference beam has to comply with another characteristic which is to maintain the initial mode so as to form a real source spot. One solution to this problem is to use monomode fibres as mentioned above. However, fibres such as these have a relatively small core diameter (of the order of 3 $\mu$m) and only a small opening. Accordingly, the coupling effectiveness of the beam issuing from fibres of this type may be relatively reduced for the application in question. Low-loss index-gradient fibres of the type currently available are also suitable for the application in question. Their diameter may vary between 40 and 100 $\mu$m. Fibres of this type enable a point source to be formed and the fibre is arranged in such a way that this point source is situated at the centre of curvature of the spherical mirror.

The arrangement thus completed forms a self-contained "halographic camera" which is connected to the laser source by optical cables and which may be placed in any interference field. The wavelengths selected for the radiation used are in the sensitivity range of the electro-optical photoconductive crystal, i.e. between 350 nm and 550 nm. This crystal may either be a thick material (thickness of the order of 2 to 3 mm) or a thin material (thickness of the order of 100 to 200 $\mu$m). With a thin material, it is possible to re-read the hologramme by changing wavelength. A system such as this may be used for the non-destructive examination of moving objects or objects subjected to a slow periodic movement. Since interferometry is effected by double exposure, the arrangement operates in the same way as the arrangement described with reference to FIG. 1.

The invention is by no means limited to the compact embodiment of the arrangement described in detail above. In particular, the optical object cable has been shown in position for illuminating a reflective object, although it is equally possible to form a hologramme by illuminating a transmissive object.

In addition, so far as the guided radiation is concerned, it is possible to use components specifically developed for guiding optical beams, such as couplers, branchers, cables, forks, for forming the useful beams.

Finally, by using other electro-optical and photoconductive materials, such as Ga As for example, and by using a semiconductor laser source with a wavelength adapted to the sensitivity range of the recording material, for example a Ga As laser, for supplying the radiation, it is possible directly to connect a fibre to the emissive face of the laser and then to use integrated optical structure to which the fibres are connected for performing the functions of separation of the beam and shut-off of the beams.

What we claim is:

1. An arrangement for displaying deformations of a deformable structure by holographic interferometry comprising a source of coherent radiation, a bulk storage medium made of an electro-optical and photoconductive recording material in which an interferometric hologram corresponding to two successive images representative of two states of deformation of said structure is recorded within first and second recording phases, said material being subjected to an electrical field orthogonal to the mean direction of the interference fringes recorded; and displaying means for recording an interferometric image of said two stages of deformation said image being reconstructed from said interferometric hologram; said source of coherent radiation illuminating said structure; said interferometric hologram being formed with an object beam diffracted by said structure and a reference beam supplied from said source of coherent radiation; said object and reference beams being simultaneously received for recording said interferometric hologram in said bulk storage medium; said bulk storage medium being read by a reading beam having the same wavelength and the same wave surface as said reference beam, for reconstructing said image.

2. An arrangement as claimed in claim 1 wherein said displaying means comprises a memory tube.

3. An arrangement as claimed in claim 1, wherein said reading beam and said reference beam are the same; said reconstructed image being virtual; said displaying means further comprising an optical means for converting said virtual image into a real image.

4. An arrangement as claimed in claim 1 wherein said interferometric hologram is formed by double exposure, a first exposure to said object beam of duration to, to being the duration necessary for the material to have reached a maximal diffraction efficiency, and a second exposure having a duration of around to/2, said arrangement comprising a shutter to mask said object beam during the phase of reconstruction of said image, said phase itself having a duration of around to/2 during which said material is subjected to said reading beam.

5. An arrangement as claimed in claim 1 comprising two optical cables respectively coupled to said source to transmit radiation for illuminating said deformable structure and said bulk storage medium, the one of said optical cables directed towards said bulk storage medium forming at its end face a point source.

6. An arrangement as claimed in claim 5, wherein the one of said optical cables directed towards said bulk storage medium is a monomode optical fibre.

7. An arrangement as claimed in claim 5, wherein the one of said optical cables directed towards said bulk storage medium is an index gradient optical fibre.

8. An arrangement as claimed in claim 5, wherein said source of coherent radiation is associated with beam-separating means for supplying a first radiation illuminating said structure and a second radiation illuminating said bulk storage medium; said second radiation being focussed with a lens at the center of the entry face of the one of said optical directed towards said bulk storage medium.

9. An arrangement as claimed in claim 5, comprising an enclosure having a transparent entry face to receive said object beam from said structure and entrances to which any one of said optical cables are fixed, said enclosure comprising said bulk storage medium and said displaying means.

10. An arrangement as claimed in claim 9, wherein a spherical mirror is placed in the enclosure in such a way that its center of curvature coincides with the end face of the one of said optical cables directed towards said bulk storage medium.

11. An arrangement as claimed in claim 10, wherein said displaying means comprise a separating plate situated in the path of the radiation reconstructed from said interferometric hologram, a polarizer, a lens and a memory tube.

12. An arrangement as claimed in claim 5, wherein said source of coherent radiation is a laser source emitting visible radiation, said recording material being a crystal sensitive to said visible radiation.

13. An arrangement as claimed in claim 5, wherein said source of coherent radiation is a semiconductor laser source, said recording material being sensitive at the wavelength of said source.

14. An arrangement for displaying deformations of a deformable structure by holographic interferometry comprising a source of coherent radiation, a bulk storage medium made of an electro-optical and photoconductive recording material in which an interferometric hologram corresponding to two successive images representative of two states of deformation of said structure is recorded within first and second recording phases, said material being subjected to an electrical field orthogonal to the mean direction of the interference fringes recorded; and displaying means for recording an interferometric image of said two states of deformation, said image being reconstructed from said interferometric hologram; said source of coherent radiation illuminating said structure; said interferometric hologram being formed with an object beam diffracted by said structure and a reference beam supplied from said source of coherent radiation; said object and reference beams being simultaneously received for recording said interferometric hologram in said bulk storage medium; said bulk storage medium being read by a reading beam having the same wavelength and the same wave surface as said reference beam, for reconstructing said image; said reading beam being propagated in a direction opposite to the direction of said reference beam; said interferometric image being a real image; said displaying means further comprising a separation plate situated between said deformable structure and said bulk storage medium to reconstruct said image in a plane different from that of said structure.

15. An arrangement as claimed in claim 14 comprising a mirror for reflecting said reference beam, said reading beam being obtained by inverse return of said reference beam transmitted by said bulk storage medium.

16. An arrangement as claimed in claim 15 wherein a quarter wave plate is disposed in the path of said reference beam between said bulk storage medium and said mirror to reduce the optical noise in said arrangement.

17. An arrangement as claimed in claim 15 wherein a polarizer is placed in the radiation path providing said interferometric image.

18. An arrangement for displaying deformations of a deformable structure by holographic interferometry comprising a source of coherent radiation, a bulk storage medium made of an electro-optical and photoconductive recording material in which an interferometric hologram corresponding to the deformations of said structure is recorded, said material being subjected to an electrical field orthogonal to the mean direction of the interference fringes recorded; and displaying means for recording an interferometric image of said deformations said image being reconstructed from said interferometric hologram; said source of coherent radiation illuminating said structure; said interferometric hologram being formed with an object beam diffracted by said structure and a reference beam supplied from said source of coherent radiation; said object and reference beams being simultaneously received for recording said interferometric hologram in said bulk storage medium; said bulk storage medium being read by a reading beam having the same wavelength and the same wave surface as said reference beam, for reconstructing said image; said structure being a vibrating structure; said interferometric hologram being formed by exposure of said bulk storage medium for a prolonged period by comparison with the period of vibration of said vibrating structure, said image having dark fringes corresponding to the zeros of the Bessel function $$J_0\left(\frac{4\pi}{\lambda}\Delta e\right),$$

$\Delta e$ being the maximum amplitude of the deformation and $\lambda$ being the wavelength of the object beam.

19. An arrangement for displaying deformations of a deformable structure by holographic interferometry comprising a source of coherent radiation, a bulk storage medium made of an electro-optical and photoconductive recording material in which an interferometric hologram corresponding to the deformations of said structure is recorded, said material being subjected to an electrical field orthogonal to the mean direction of the interference fringes recorded; and displaying means for recording an interferometric image of said deformations said image being reconstructed from said interferometric hologram; said source of coherent radiation illuminating said structure; said interferometric hologram being formed with an object beam diffracted by said structure and a reference beam supplied from said source of coherent radiation; said object and reference beams being simultaneously received for recording said interferometric hologram in said bulk storage medium; said bulk storage medium being read by a reading beam having the same wavelength and the same wave surface as said reference beam, for reconstructing said image; said arrangement for the observation of a vibrating structure, further comprising an acousto-optical device arranged in the path of said reference beam to supply reference radiation frequency-shifted in relation to that of said object beam by a multiple NF of the vibration frequency F of the structure, said interferometric hologram being formed by exposure of said bulk storage medium to the object beam for a prolonged period by comparison with the period of vibration of said structure, said image having dark fringes corresponding to the zeros of the Bessel function $$J_N\left(\frac{4\pi}{\lambda}\Delta e\right),$$

$\Delta e$ being the maximum amplitude of deformation and $\lambda$ the wavelength of said object beam.

* * * * *